May 28, 1968     T. C. J. L. STAAR     3,385,534
TAPE DECK
Filed July 22, 1966     7 Sheets-Sheet 1
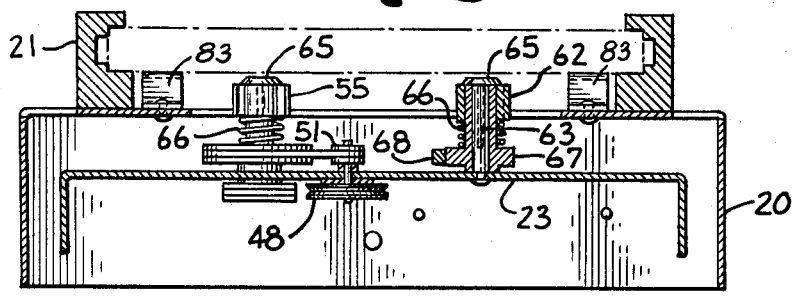
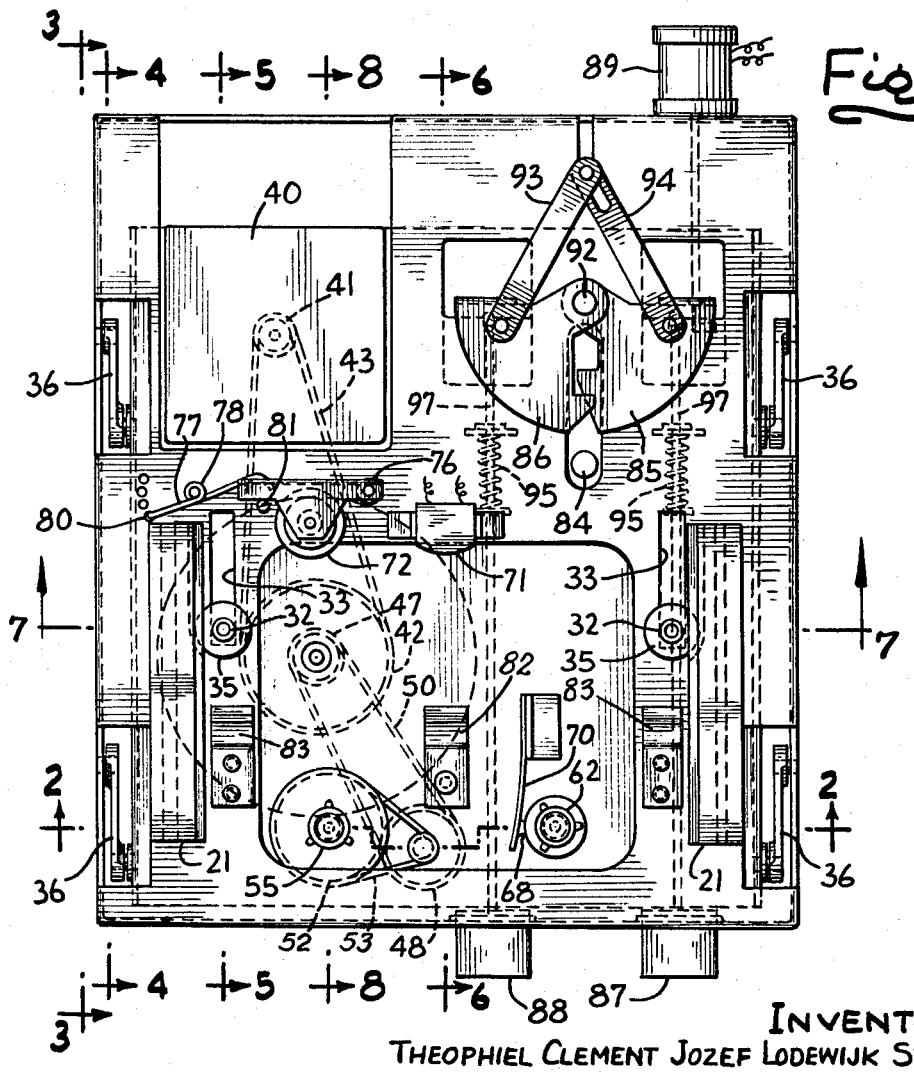
INVENTOR
THEOPHIEL CLEMENT JOZEF LODEWIJK STAAR
by: Wolfe, Hubbard, Voit & Osann
ATTYS.

INVENTOR
THEOPHIEL CLEMENT JOZEF LODEWIJK STAAR by: Wolfe, Hubbard, Voit & Osann
ATTYS.

May 28, 1968
T. C. J. L. STAAR
3,385,534
TAPE DECK
Filed July 22, 1966
7 Sheets-Sheet 3
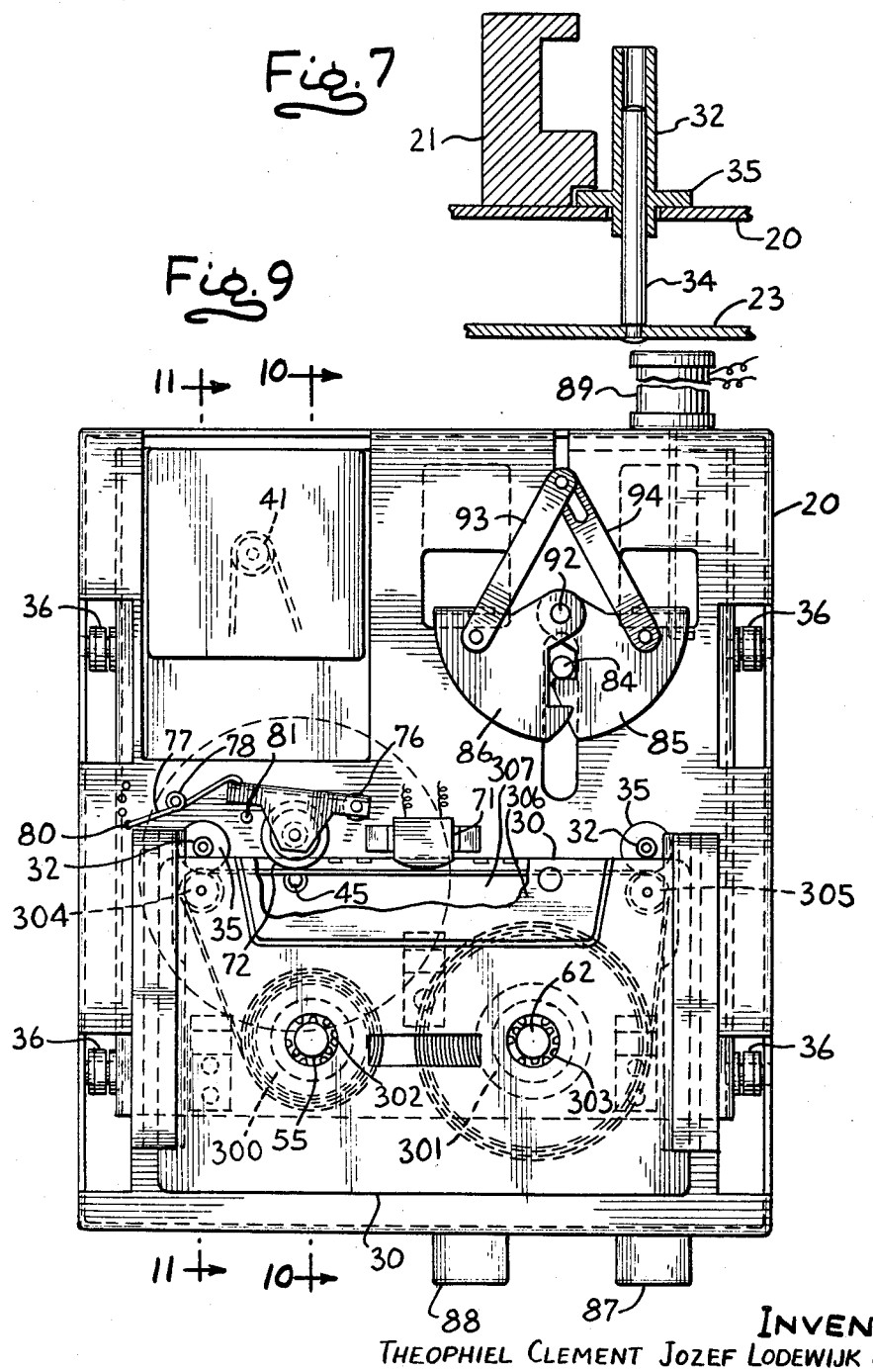
INVENTOR
THEOPHIEL CLEMENT JOZEF LODEWIJK STAAR
by: Wolfe, Hubbard, Voit & Osann
ATTYS.

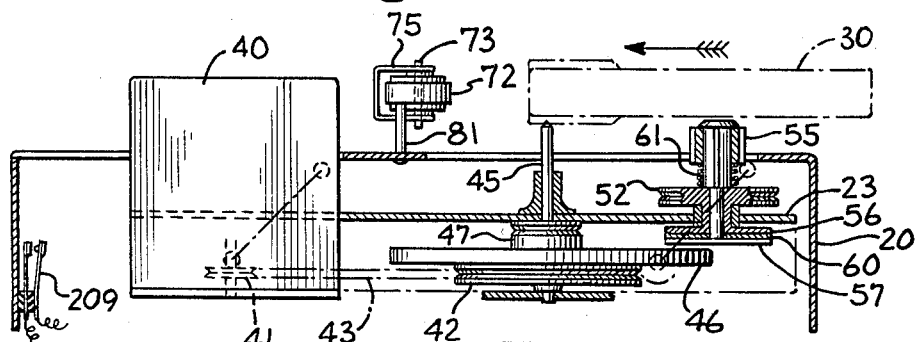
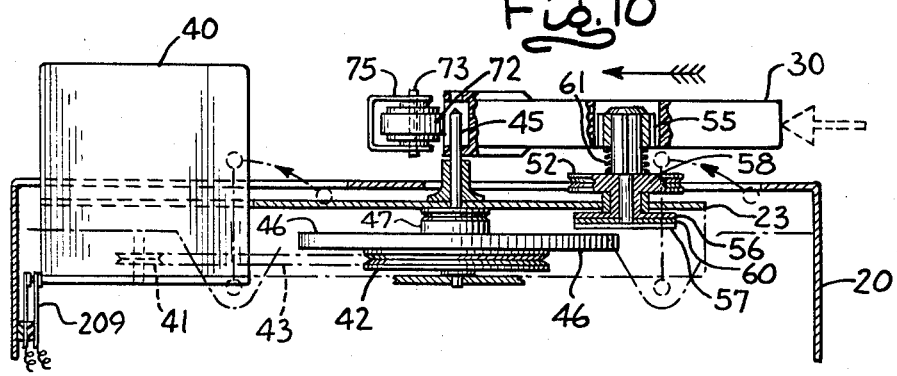
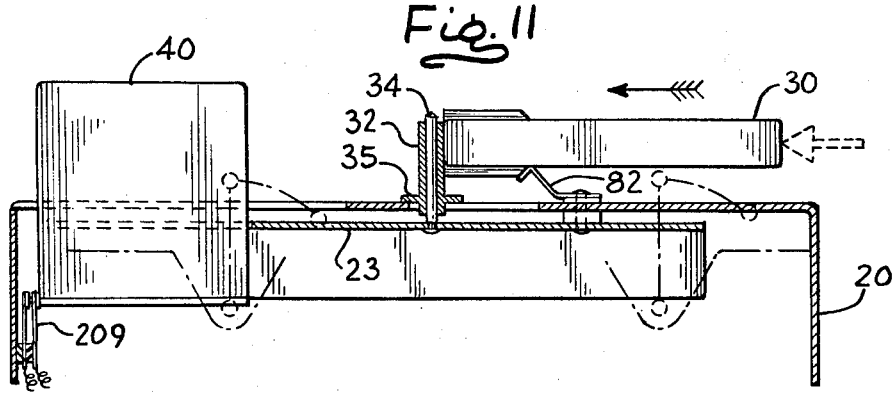

May 28, 1968     T. C. J. L. STAAR     3,385,534
TAPE DECK
Filed July 22, 1966     7 Sheets-Sheet 5
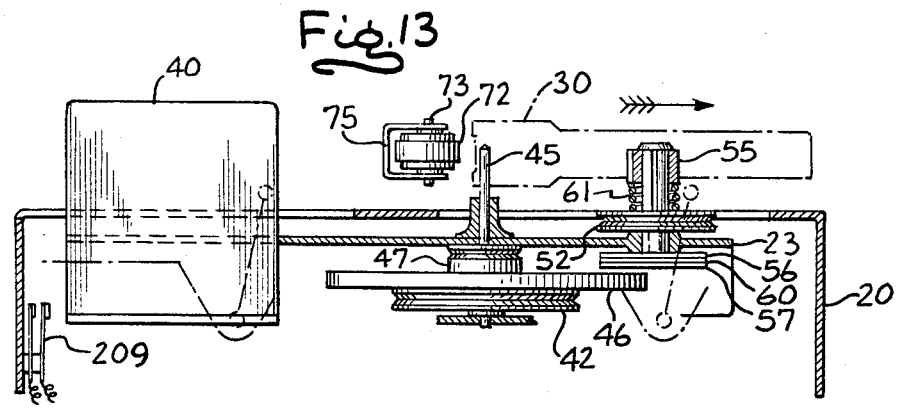
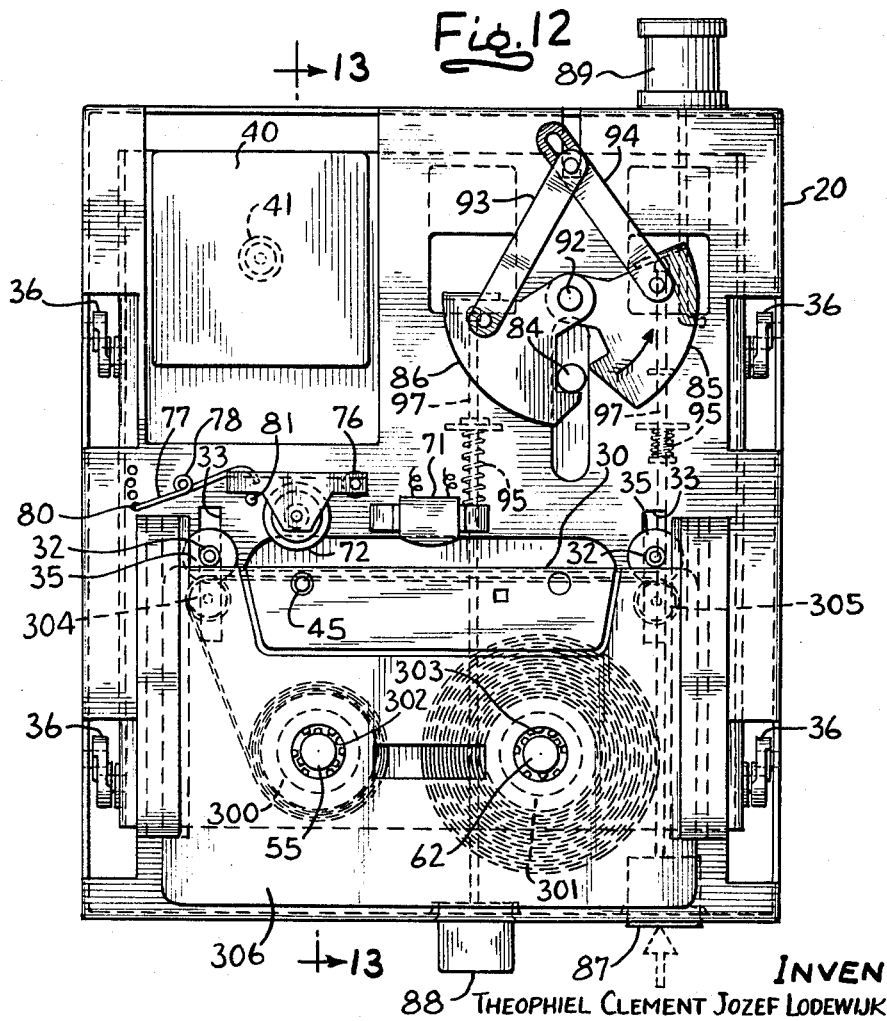
INVENTOR
THEOPHIEL CLEMENT JOZEF LODEWIJK STAAR
by: Wolfe, Hubbard, Voit & Osann
ATTYS.

May 28, 1968 T. C. J. L. STAAR 3,385,534
TAPE DECK
Filed July 22, 1966 7 Sheets-Sheet 6
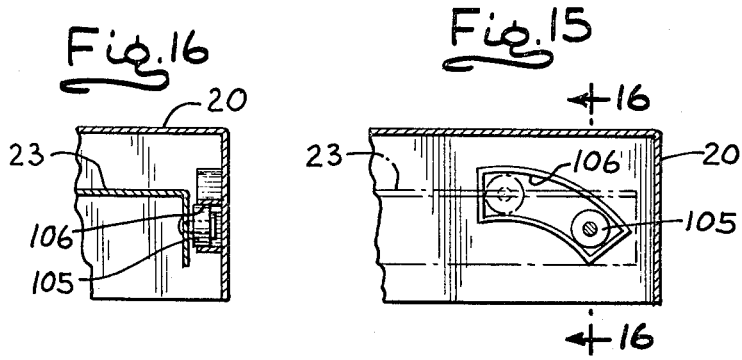
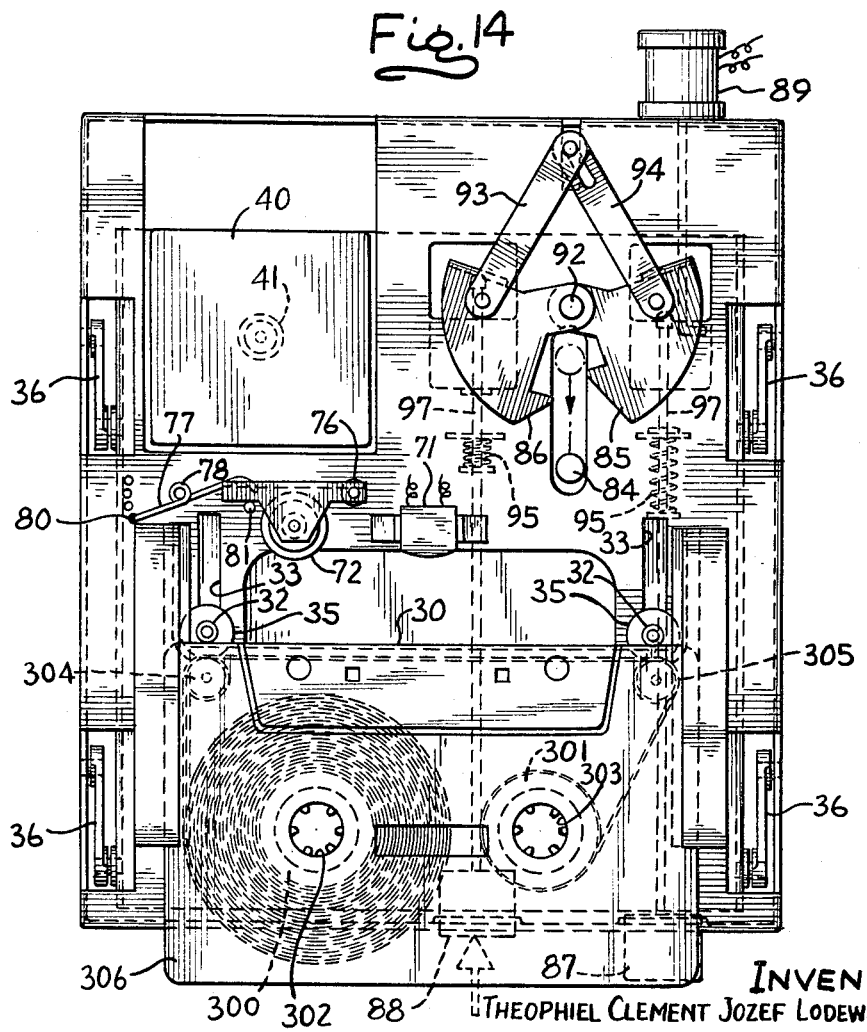
INVENTOR
THEOPHIEL CLEMENT JOZEF LODEWIJK STAAR
by: Wolfe, Hubbard, Voit & Osann
ATTYS.

May 28, 1968 T. C. J. L. STAAR 3,385,534
TAPE DECK
Filed July 22, 1966 7 Sheets-Sheet 7
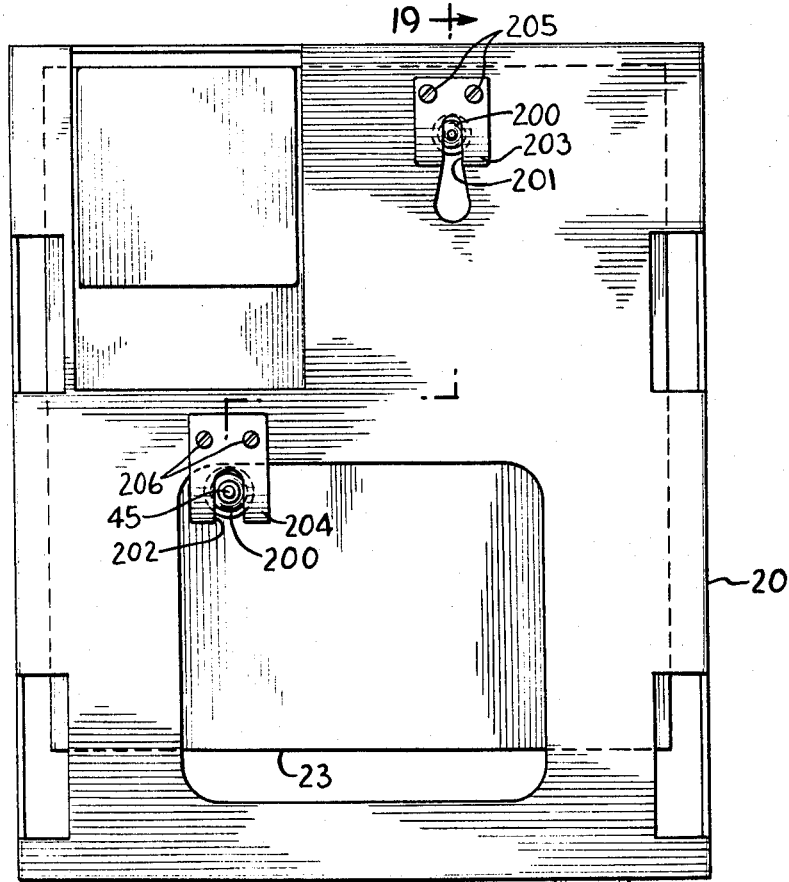
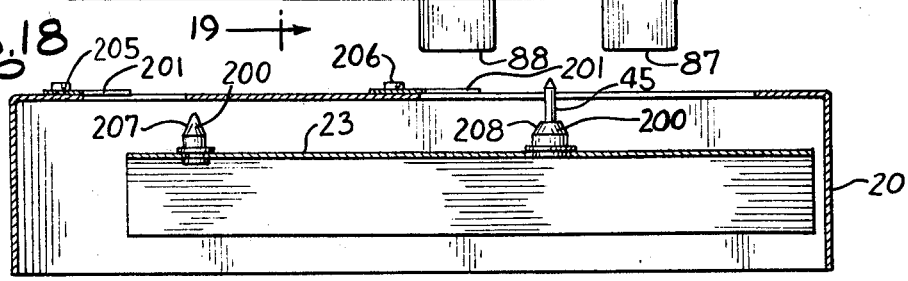
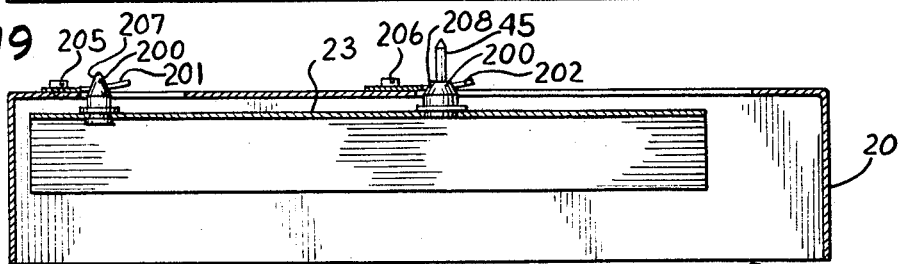
INVENTOR
THEOPHIEL CLEMENT JOZEF LODEWIJK STAAR
by: Wolfe, Hubbard, Voit & Osann
ATTYS.

United States Patent Office 3,385,534
Patented May 28, 1968

3,385,534
TAPE DECK
Theophiel Clement Jozef Lodewijk Staar, Kraainem, Belgium, assignor to Staar, S.A., Brussels, Belgium, a corporation of Belgium
Filed July 22, 1966, Ser. No. 567,115
Claims priority, application Belgium, Nov. 3, 1965, 19,793, Patent 671,749; July 6, 1966, 30,491, Patent 683,709
28 Claims. (Cl. 242—55.13)

This invention relates generally to apparatus for the recording and playback of sound from a magnetic tape in a self-contained cartridge or cassette. More particularly, the invention concerns tape recorder mechanisms which utilize cartridges in which the drive elements of the recorder tape deck mechanism must penetrate into the cartridge in order to engage and drive the tape contained on reels therein.

An important advantage of cartridge-loading tape recorders is that loading and removing the tape from the machine is greatly simplified. The magnetic tape is commonly stored on one of two reels within the cartridge, and during operation it is carried past a recording or playback sound head to a second reel, on which it is stored. When the tape has been transferred to the second reel during the playing of one band or track, the cartridge may commonly be released from the machine, reversed, and a second band or track of recorded material played as the tape is run back to the first reel. Certain driving elements of the tape deck mechanism must therefore enter the cartridge to provide means for controllably driving the tape past the sound head. If the commonly-used capstan drive system is employed, either the capstan or its associated pressure roller must penetrate the cartridge to engage the tape, and tape transport and control spindles must also enter the tape reel hubs to provide proper tape tension on the feed reel and driving force for the take-up reel.

The cartridge need not be placed precisely in position when inserted by the operator, because the final exact positioning of the tape against the recording or playback sound head is done automatically as the cartridge is inserted. In this connection, however, the exceedingly narrow pole gaps of modern magnetic recording heads make it important to provide positive and accurately reproducible alignment of the tape to the sound head when in the operative position. Heretofore, the loading operation required that the cartridge be forced down over the various drive elements and the sound head be brought into engagement with the tape. The cartridge might be simply pushed into place by the operator, or supported on a hinged tray of some kind and swung down onto the drive elements in an angular or rotating fashion. The drive capstan in particular must penetrate the cartridge in a precise manner to avoid these difficulties. Inaccuracies in locating the cartridge sometimes resulted in bunching or tearing of the tape by the drive elements as they penetrated, causing a jammed machine or a ruined cartridge.

In view of these requirements, it is a primary object of the present invention to provide a tape deck mechanism for cartridge-loading tape recorders in which loading and unloading of the cartridge is reduced to a single in-and-out movement of the cartridge, while maintaining a high degree of accuracy and precision in the engagement of the tape drive and tape transport means of the recorder mechanism. A related object is to provide a tape deck mechanism whereby the drive and transport means are automatically brought into engagement with the tape cartridge as the cartridge is inserted into the machine in a movement in a single direction, and the cartridge is located in an accurate and positive manner with respect to the sound head as the cartridge is slid into operating position.

Another object is to provide a tape recorder of the above description in which the direction of movement of the drive and transport elements upon entering the tape cartridge is exactly parallel to the plane of the tape, rather than entering the cartridge in an angular or rotating fashion, so that jamming and breaking of the tape is avoided.

A further object is to provide a tape deck mechanism of the above description in which the act of the operator in inserting the cartridge into the machine serves to releasably lock the cartridge into operating position at the end of its movement. A related object is to cause the tape driving and control means and tape recording or playback means to become operative through the act of the operator in inserting the cartridge.

An allied object is to provide a mechanism of the above description in which the cartridge may be selectively released from the machine by way of an intermediate position in which the tape is no longer in engagement with the tape drive means and sound head, but in which the tape transport spindles remain in engagement with the tape reels in order to both retain the cartridge and to allow the operator to transfer the tape at higher speeds in fast forward winding function, or for rewinding the tape back to its original reel.

Other objects and advantages of the invention will become apparent upon reading the following detailed description and upon reference to the drawings, in which:

FIGURE 1 is a plan view of the tape deck mechanism of the present invention, with the associated electronics and exterior covers being omitted for clarity;

FIG. 2 is a section taken in the plane 2—2 of FIGURE 1;

FIG. 7 is an enlarged fragmentary section taken in the plane 7—7 of FIGURE 1;

FIG. 8 is a section taken in the plane 8—8 of FIGURE 1;

FIG. 9 is a plan view of the tape deck mechanism with a tape cartridge shown in position for recording or playback;

FIG. 10 is a section taken in the plane 10—10 of FIG. 9;

FIG. 11 is a section taken in the plane 11—11 of FIG. 9;

FIG. 12 is a plan view of the tape deck mechanism with the tape cartridge shown in an intermediate position wherein the tape is removed from the tape drive means and sound head, but the tape transport means remains in engagement;

FIG. 13 is a section taken in the plane 13—13 of FIG. 12;

FIG. 14 is a plan view of the tape deck mechanism with a tape cartridge shown released from both the tape drive means and transport means and ready for removal by the operator;

FIG. 15 is an enlarged partial section of an alternative embodiment of the invention, which mechanism may be utilized in place of that shown in FIG. 4;

FIG. 16 is a section taken in the plane 16—16 of FIG. 15;

FIG. 17 is a plan view of a tape deck mechanism employing an alternative feature of the present invention with the tape drive and control mechanism omitted for clarity;

FIG. 18 is a section taken in the plane 18—18 of FIG. 17; and

FIG. 19 is a section similar to FIG. 18, but with the mechanism shown as with a tape cartridge inserted in operating position.

Figure 3:
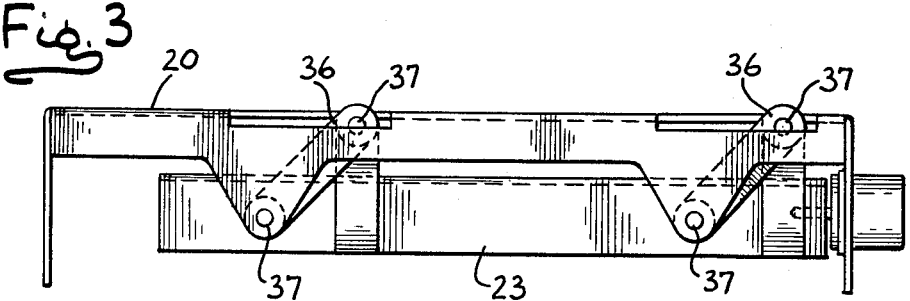
FIG. 3 is a section taken in the plane 3—3 of FIGURE 1.
Figure 4:
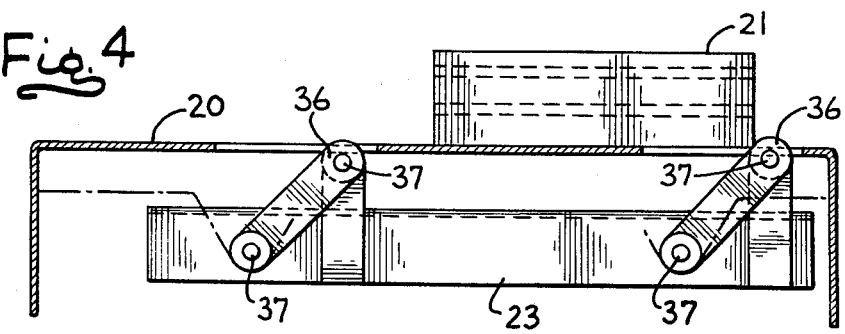
FIG. 4 is a section taken in the plane 4—4 of FIGURE 1.

While the invention will be described in connection with preferred and alternative embodiments, it will be understood that I do not intend to limit the invention to those embodiments, but intend to cover all alternatives and equivalent constructions as may be included within the spirit and scope of the invention as defined by the appended claims.

Turning first to FIGURE 1, there is shown a tape recorder tape deck mechanism constructed according to the present invention. The mechanism comprises a fixed frame 20 to which are attached guides 21 having grooves or slots into which the tape cartridge is introduced by the operator. The driving elements of the recorder mechanism are carried by a movable frame 23 disposed beneath the fixed frame 20 and movable into penetrating engagement with the tape cartridge when the latter is inserted into position for operation.

In accordance with the invention, when a tape cartridge 30 is inserted into operating position within the machine (FIG. 1), it is guided and retained within the grooves and engages a pair of upright lugs 32 which, when moved forward by the motion of inserting the cartridge, cause the movable frame 23 to swing in the direction of cartridge movement with a rising motion which causes the various drive elements to penetrate the respective openings of the cartridge and become operably engaged therewith. This engaging motion is carried out solely by the movable frame 23, with the cartridge 30 being restricted by the guides 21 to a direct in-and-out movement in a single lateral plane.

Figure 5:
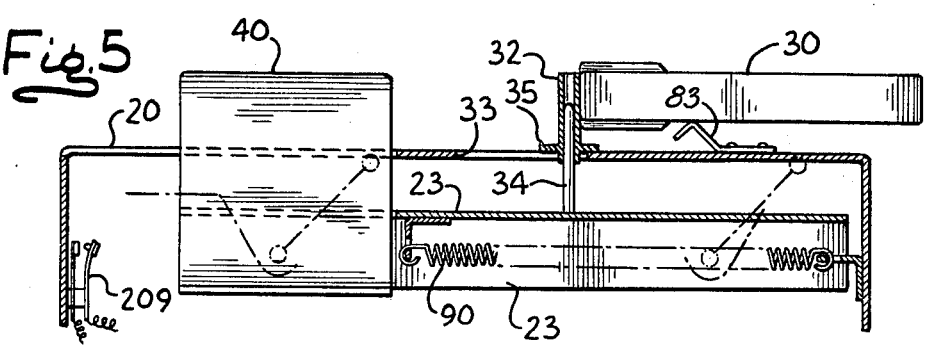
FIG. 5 is a section taken in the plane 5—5 of FIGURE 1.
Figure 6:
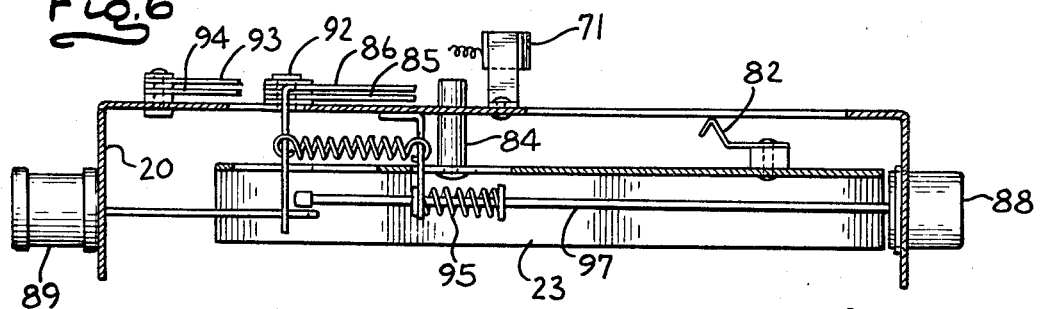
FIG. 6 is a section taken in the plane 6—6 of FIGURE 1.

When a cartridge 30 is introduced into the mechanism by the operator, it is guided in the guides 21, and on being moved forward, the cartridge engages a pair of upright lugs 32 and drives them forward in their slots 33 in the frame 20. The lugs 32 are hollow and contain slidable pins 34 (FIG. 5) which extend upwardly from the movable frome 23. A flange 35 is provided at the base of each lug 32 to confine its movement along the frame 20 to a path coplanar with the movement of the cartridge 30 in the guides 21.

The movable frame 23 which contains the various drive elements which internally engage the tape cartridge is suspended from the fixed frame 20 by four links 36 which are pivoted on shafts 37 to form a parallelogram linkage on each side. As a result, the movable frame 23 is articulated to the frame 20 by the deformable parallelogram linkages just described, and as the cartridge 30 is introduced into the mechanism, contact of the cartridge with the lugs 32 and concentric pins 34 causes the movable frame 23 to move upward and coinciding exactly with that of the cartridge with respect to both direction and distance. It may be seen, therefore, that if the cartridge 30 is taken as a point of reference, the movable frame 23 rises vertically into the cartridge with no relative lateral movement whatsoever. Any deviation of the movable frame 23 from a path of direct vertical engagement with the cartridge 30 is prevented by the lugs 32 and lug pins 34 which key the movable frame 23 to the cartridge 30.

Carried by the movable frame 23 are the drive elements by which the tape is driven and controlled within the cartridge 30 (FIGS. 1, 2, 8 and 10). A drive motor 40 propels a drive pulley 41 which is situated beneath the movable frame 23, and the pulley 41 drives a capstan pulley 42 by means of a belt 43. The capstan pulley 42 is drivingly connected and coaxial with capstan 45, a flywheel 46, and another drive pulley 47. The drive pulley 47 is in turn drivingly connected to an intermediate pulley 48 by a belt 50, and the intermediate pulley 48 is coaxial and drivingly connected to an intermediate drive pulley 51, which is in turn drivingly connected to a take-up pulley 52 by another belt 53. The take-up pulley 52 (FIGS. 8 and 10) is drivingly connected to a splined take-up hub 55 which penetrates and engages the splined hub of the take-up reel (not shown) within the cartridge 30 as the drive elements on the movable frame 23 are brought into engagement.

The driving connection between the take-up pulley 52 and the splined hub 55 is not direct, however, but is accomplished by means of a slipable friction clutch consisting of a first drive plate 56 connected to the pulley 52, a second drive plate 57 connected to the hub 55 by means of an inner shaft 58 which is coaxial with the take-up pulley 52, and a friction disk 60 interposed between the drive plates 56 and 57. The requisite friction to drive the splined hub 55 is supplied by a spring 61 which urges the drive plates together, compressing the friction disk 60. In this manner, a constant torque is available at the splined hub 55 so that the tape may be wound on the take-up reel within the cartridge 30 due to the fact that the take-up pulley 52 is constantly driven at a speed greater than that of the splined hub 55 by the frictional drive.

Also carried by the movable frame 23 is a supply reel tensioner (FIG. 2). A splined hub 62 similar to the hub 55 is keyed to a shaft 63 having a head 65 toward which the hub 62 is urged by a spring 66. A similar arrangement is provided in the hub 55, whereby the hubs engage the cartridge reels prior to engagement of other portions of the drive mechanism, and remain in engagement throughout the rest of the movement of the movable frame 23. At its base, the shaft 63 has a flange 67 against which a brake shoe 68 (FIG. 1) is resiliently urged by a spring 70 carried by the movable frame 23. The action of the brake shoe 58 on the flange 67 provides a predetermined friction torque on the hub 62 which provides a controlled degree of tension of the tape on the cartridge supply reel (not shown) as the tape is run through.

A recording or playback sound head 71 and a pressure roller 72 are carried by the frame 20. The roller 72 rotates on a spindle 73 borne by a link 75 pivoting about a pivot 76 connected to the frame 20 and urged into engagement with the capstan 45 by a spring 77 anchored to the frame 20 by a pin 78. The spring 77 is selectively anchorable in one of four anchor points 80 to obtain different degrees of pressure, and the free motion of the roller 72 is limited by a pin 81.

As has been described, the forward motion of the tape cartridge 30 as it is inserted into the machine by the operator causes the movable plate 23 to follow the horizontal movement of the cartridge and to be maintained in alignment therewith and causes the drive elements to rise into engagement through apertures provided in the cartridge for this purpose. The nose, or front, of the cartridge 30 is preferably provided with an enlargement which may be engaged by a spring 82 on the movable plate 23, as shown in FIG. 11, thereby resiliently urging the cartridge against the lugs 32 to maintain the exact relation of the cartridge in operation. In this position (FIGS. 9, 10 and 11), the capstan 45 emerges behind the tape while the splined hubs 55 and 62 are introduced into the corresponding apertures within the reels of tape. A spring strip 83 (FIGS. 1, 2 and 5) is provided on the top of the frame 20 and adjacent the inner surface of each of the guides 21 and is so disposed as to provide an upwardly extending thrust on the cartridge in the course of its sliding movement in order to position it against the top surfaces of the guides 21. At the end of the sliding movement, the tape exposed along the front wall of the cartridge 30 and slightly withdrawn therefrom is brought into contact with the sound head 71, which penetrates slightly into the cartridge. The tape is gripped adjacent the sound head 71 by the pinching action of the pressure roller 72 against the rotating capstan 45, whereby the tape is advanced past the sound head 71. Internal pressure pads (not shown) located within the tape cartridge 30 serve to resiliently urge the tape against the sound head 71.

As a feature of the invention, a catch mechanism is provided by which the movable frame 23 may be selectively retained in three positions. For this purpose a latch pin 84 is provided on the movable frame to engage a pair of latches 85, 86 which are provided to hold the movable frame 23 and tape cartridge in position. The first latch 85 is manually releasable by a push button 87 located at the front of the frame 20, and the second latch 86 is similarly operable by a second push button 88, or by an electrical solenoid 89 which may be actuated automatically at the end of the recorder playing cycle to disengage the cartridge. When fully engaged, the first latch 85 secures the frame 23 while the spring 82 positively retains the cartridge 30 in recording or playback position until push button 87 or 88 is actuated by the operator. When push button 87 is pressed, the first latch 85 releases, allowing a pair of return springs 90 to move the frame 23 and cartridge 30 back to a second position (FIG. 12) where they are held by the second latch 86. In the course of such movement of the frame 23 to the second position, the spring retainer 82 is disengaged from behind the enlargement on the cartridge. In the second or intermediate position, the functions of fast intra-reel transfer of the tape may be accomplished since the hubs 55, 62 are still engaged by the drive while the tape is no longer pinched against the capstan and held against the head. On actuating the second push button 88, the second latch 86 is released as well as the first latch 85 and the frame 23 moves to its most rearward position (FIG. 14), where the cartridge may be removed by the operator.

In the second or intermediate position (FIG. 12) where the cartridge is held for fast intra-reel transfer of the tape, the tape is no longer pinched against the capstan and held against the head. This allows high speed intra-reel transfer of the tape without damage thereto by such elements. The cartridge may be completely ejected from the unit or it may be shifted from the intermediate to the forward operative position for playback of the tape within the cartridge. Another feature which is provided by the intermediate position, is that the cartridge may be left for a time in this position, and associated means may be utilized to disconnect the amplifiers and related equipment so that the unit is in effect completely turned off. When in the intermediate position the pressure roller 72 is separated from engagement with the capstan and from pinching the tape therebetween, thus avoiding the development of flat spots on the pressure roller through periods of nonuse of the unit.

As the movable frame 23 is carried forward and upward by the action of the operator in inserting the tape cartridge 30, the latch pin 84 engages the second latch 86, causing it to pivot about a common pivot 92 on which both latches 85 and 86 are pivoted. A solid link 93 on the second latch 86 is pinned to the slotted end of a slotted link 94, the latter being attached at its other end to the first latch 85. Thus, it may be seen that as the latch pin 84 moves into engagement with the second latch 86, the action has passed both latches and is retained behind the first latch 85. The tape cartridge 30 is then in operating position for recording or playback. The latches 85 and 86 are resiliently retained in their latched positions by latch springs 95. Control rods 97 are disposed horizontally beneath the fixed frame 20 and extend through supports 98 having at their ends the push buttons 87 and 88. Control springs 96 are interposed between the supports 98 and stop washers 99 to resiliently urge the rods 97 and associated latches 85, 86 and push buttons 87, 88 toward the front of the mechanism.

To release the tape cartridge 30, the operator depresses the push button 87 to release the first latch 85, thereby allowing the movable frame 23 to be drawn outwardly by the return springs 90 until the latch pin 84 rests against the notch of the second latch 86. In accordance with the invention, in this position the tape is withdrawn from the sound head 71 and pressure roller 72 but may still be driven by the drive mechanism, since both hubs 55 and 62 are still engaged with their respective reels within the tape cartridge. Upon actuation of the second push button 88 by the operator, the second latch 86 is released, freeing the latch pin 84 and allowing the return springs 90 to return the movable frame 23 to its starting position and eject the cartridge 30 to where it may be grasped by the operator.

As has been described, the provision of a double parallelogram linkage comprising the fixed frame 20, the movable frame 23 and the articulated links 36 cause the tape drive and control elements of the movable frame 20 to rise vertically into engagement with corresponding openings in the tape cartridge 30. In an alternative embodiment of the invention, however, this action may be provided by means of rollers 105 (FIGS. 15 and 16) fixed to the movable frame 23 and riding in runways 106 of suitable profile attached to the fixed frame 20. This means merely duplicates the motion of the aforementioned parallelogram linkage by camming the movable frame 23 and its associated drive elements into cooperation with the tape cartridge 30 in the manner heretofore described.

As a further feature of the invention (FIGS. 17–19), the movable frame 23 is securely and precisely located with respect to the fixed frame 20 when the tape cartridge 30 is in the record or playback position by means of vertically tapered guide or locating pins 200 fixed to the movable frame 23 and cooperating with locating slots 201, 202 defined by openings in the fixed frame 20 and resilient fingers 203, 204 carried thereby. As the movable frame 23 moves forward and upward under the action of either the parallelogram linkage or the cam mechanisms previously described, the guide pins 200 rise into the wide portions of the locating slots 201, 202 and are moved forward into the narrow portions to a point wherein they move into tight engagement therewith so that their lateral freedom of movement disappears and the movable frame 23 is accurately positioned within minimum play with respect to the fixed frame 20. This feature is of considerable signficance in eliminating the effect of vibration on the movement of the tape past the sound head 83 when the tape recorder is used in a moving vehicle, for example.

For the purpose of securely holding the movable frame against lateral movement by means of the locating pins 200 without locking the pins in the locating slots 201, 202, in the final stages of the movement of the pins forwardly and upwardly with the movable frame, the locating fingers 203, 204 are constructed so as to yield. To this end, the fingers are made of resilient material such as spring steel and being fastened at one end to the fixed frame by means such as screws 205, 206 are lifted upwards at their free ends by the final movement of the pins, in which lifted position they are shown in FIG. 19. When the movable frame is released by either push button 87 or 88 the resilient locating fingers 203, 204 which press down on the tapered sections 207, 208 of the pins, tend to assist the downward and rearward reverse motion of the movable frame which frees the pins from the locating slots. Preferably, the pins 200 and slots 201, 202 are spaced from each other as far as possible to gain maximum advantage of the stabilizing effect. In the present arrangement the capstan 45 is carried by one of the pins 200, so as to provide the maximum spacing of the pins.

When the operating push buttons 87 and 88 are actuated by the operator, the movable frame 23 swings down and rearward in reverse to the way it entered, withdrawing the guide pins 200 from the slots, 202 and allowing the cartridge to be ejected as has been heretofore described. It will readily be apparent that this improvement makes advantageous use of the parallelogram action of the movable frame 23 with relationship to the fixed frame 20 because it enables the length of the guide slots 201 to be reduced to a minimum, thereby allowing the maximum amount of space on the fixed frame for use in securing the other essential elements of the tape recorder mechanism. The use of tapered grooves 201 allows the movable frame 23 to be guided during its movement so that its operating position is very exactly determined without the need of providing such accuracy throughout the entire range of movement of the movable frame 23.

Operation of the tape recorder of the present invention may be controlled manually, or, in the preferred embodiment, it may be initiated automatically by the provision of switch contacts 209 on the rear of the fixed frame 20 where they may be closed by the action of the movable frame 23 upon being latched into operating position by the first latch 85 (FIGS. 10 and 11). With this provision, the operator may both load and start the machine merely by the insertion of the tape cartridge 30 in the manner heretofore described, without the need of manipulating other controls or switches.

Similarly, operating switches may be employed to control circuits associated with the operation of the unit, such as the amplifiers, or connect the output of the player to external equipment.

While the specific details of construction of the tape cartridge adapted to be received in the tape deck of this invention may be varied, the advantageous features of the tape cartridge shown herein include a pair of reels 300, 301 having grooved sockets 302, 303 adapted for non-slip engagement by the splined hubs 55, 62 on the movable frame of the tape deck. The tape, having a magnetizable coating on the outward side which is driven across the sound head 71, is connected at its ends to the reels 300, 301, and is transported therebetween running over guides or the like 304, 305 which are carried between the generally rectangular substantially parallel faces 306, 307 of the cartridge. Thus the inward uncoated surface of the tape is engaged by such guides and the driven capstan 45. From FIG. 2, for example, it will also be seen that the tape cartridge is relatively thin as compared with the area of its faces, such faces being provided with openings through which penetrate the capstan 45 for driving the tape and the hubs 55, 62 for drivingly engaging the tape reels to transport the tape within the cartridge.

I claim as my invention:

1. For use with self-contained tape cartridges having a face with openings for receiving the actuating elements of a playing mechanism, a tape deck comprising, in combination, a fixed frame having guide means for receiving a tape cartridge and constraining the movement of said cartridge on insertion and removal to a single plane, and a movable frame disposed adjacent to the plane of cartridge movement and carrying drive means for driving the tape past a sound head and transport means for controlling and transporting the tape within said cartridge, said drive means and transport means having projections for penetrating the openings of said cartridge and engaging operative elements therein, and translation means operable by insertion of said cartridge into the tape deck and supporting said movable frame for relative motion of said drive means and transport means projections substantially perpendicular to the plane of cartridge movement and toward said cartridge so as to follow the movement of said cartridge and to draw said projections into engagement with the operative elements within said cartridge, said engagement being imparted with a linear motion substantially perpendicular relative to the face of said cartridge.

2. The tape deck of claim 1 in which said translation means comprises a plurality of articulated links connecting said movable frame to said fixed frame, said links and frames forming a deformable parallelogram, and said movable frame having a lug engageable with a tape cartridge inserted in said fixed frame for actuating said movable frame and associated drive means and transport means into engagement with said cartridge.

3. The tape deck of claim 1 in which said translation means comprises a plurality of rollers and ramps interconnecting said fixed frame and said movable frame, said movable frame having a lug engageable with a tape cartridge inserted in said fixed frame for actuating said movable frame and associated drive means and transport means into engagement with said cartridge.

4. The tape deck of claim 1 in which one of said frames has means defining a locating slot in a plane parallel with the plane of cartridge movement and the other of said frames has a locating pin engageable with a gradually narrowing section of said locating slot as the said frames are brought toward each other by the insertion of a tape cartridge, said locating pin cooperating with said locating slot with a maximum of clearance when said frames are at maximum separation due to the removal of a tape cartridge, and having a minimum of clearance when said frames are at minimum separation thereby to minimize relative lateral play when said tape cartridge is in operating position for recording or playback.

5. The tape deck of claim 4 having a first locating pin and corresponding locating slot disposed substantially away from one side of the plane of the tape as it passes the sound head, and a second locating pin and corresponding slot disposed on the other side of said plane.

6. The tape deck of claim 1 having selectively releasable latch means for securing said tape cartridge in a first operative position in which said tape drive means is engaged to draw said tape past said sound head and said tape transport means is engaged to control and transport the tape within said cartridge, a second operative position in which said tape cartridge is withdrawn from said sound head and said tape drive means is disengaged while said tape transport means remains engaged and a third operative position in which said tape drive means and tape transport means are disengaged and said cartridge may be removed by the operator.

7. The tape deck of claim 1 having switch means for energizing said tape deck, said switch means being operable by the insertion of said tape cartridge by the operator into operating position for recording or playback.

8. A tape deck adapted to receive self-contained tape cartridges comprising, in combination, a fixed frame for receiving a tape cartridge and constraining the movement of said cartridge on insertion and removal to a single plane, and a movable frame disposed adjacent to the path of said cartridge and carrying drive and transport means for controlling and transporting the tape within said cartridge, said drive and transport means being penetrative into said cartridge for engaging operative elements therein, and translation means supporting said movable frame for translation of said drive and transport means as they penetrate the cartridge normal to and following the movement of said cartridge and drawing said drive and transport means into engagement with the operative elements within said cartridge, said engagement being imparted with a linear motion substantially perpendicular relative to the face of said cartridge.

9. A tape deck adapted to receive self-contained tape cartridges comprising, in combination, a fixed frame for receiving a tape cartridge and maintaining said cartridge in the same orientation on insertion to an operative position, a movable frame disposed adjacent to the plane of cartridge orientation and carrying tape drive means for driving the tape past a sound head and reel transport means for controlling and transporting the tape within said cartridge, said drive and transport means being penetrative into said cartridge for engaging operative elements therein in the course of movement of said movable frame to an operative position, translation means supporting said movable frame for motion of said drive and transport means as they penetrate the cartridge substantially perpendicular to the plane of cartridge orientation while maintaining said drive and transport means on said movable frame following the movement of and in alignment with operative elements within said cartridge, resilient means connected to the movable frame so as to oppose the motion of said movable frame toward its operative position, means for latching said movable frame and for retaining said cartridge in operative positions, and means for releasing said latching means so as to allow said resilient means to shift said movable frame from its operative position and to eject the cartridge.

10. A tape deck according to claim 9 in which said movable frame and said cartridge also have an intermediate position in which only said reel transport means engages operative elements in said cartridge for transport of the tape therein, and in which said latching means is selectively operable to latch said movable frame and said cartridge in either said operative or intermediate positions.

11. A tape deck according to claim 10 in which said releasing means is selectively operable to allow said movable frame and cartridge to shift from their operative positions either to their intermediate positions or to eject the cartridge.

12. The tape deck of claim 4 in which one of said frames supports a resilient element defining said locating slot and the other of said frames has a tapered locating pin engageable with the gradually narrowing section of said locating slot as the said frames are brought toward each other to operative position by the insertion of a tape cartridge, said element being resiliently lifted from its support by the taper of the pin as said frames terminate their relative movement into operative position, and said resilient element tending to assist the movement of said frames away from each other by the removal of a tape cartridge.

13. The tape deck of claim 12 in which both said locating slots are defined by resilient elements supported by the frames respectively, and both said locating pins are tapered.

14. The tape deck of claim 5 in which one of said locating pins is concentric with the capstan.

15. The tape deck of claim 8 in which said cartridge is adapted to engage means carried by said movable frame so that the insertion of the cartridge to its operative position in the tape deck moves the movable deck to its operative position with said drive and transport means engaged with the operative elements in the cartridge.

16. The tape deck of claim 8 in which said drive means includes a driven capstan carried by said movable frame and adapted with said cartridge in the operative position in said tape deck to penetrate said cartridge and engage the tape on the inward side thereof, and a pinch roller carried by said fixed frame and resiliently biased to pinch the tape against said capstan.

17. The tape deck of claim 15 having selectively releaseable latch means engageable with the tape cartridge to hold said tape cartridge and said movable frame in their operative positions.

18. The tape deck of claim 1 adapted to receive a relatively thin cartridge having substantially parallel generally rectangular faces and in which said fixed frame includes side rails adapted to receive and support the tape cartridge for sliding edgewise movement in a single plane.

19. The tape deck of claim 16 adapted to receive a tape cartridge in which the outward side of the tape carries a magnetizable coating and in which said movable frame has fixed thereto a sound head so that with the tape cartridge in its operative position the outward side of the tape is driven by said tape drive means across said sound head.

20. The tape deck of claim 1 adapted to receive a tape cartridge having two reels with the tape being transportable from one reel to the other, and in which said tape transport means on said movable frame includes a pair of hubs adapted to penetrate said cartridge and drivingly engage the tape reels with the cartridge in its operative position in the tape deck, means including a slipable drive providing a constant driving torque for rotating one of said hubs, and brake means connected to the other of said hubs to provide a controlled tension on the tape during its transport.

21. A tape deck according to claim 9 in which said translation means supports said movable frame parallel to the plane of cartridge orientation in the course of movement of said movable frame to and from its operative position.

22. A tape deck according to claim 11 in which in the course of movement of said movable frame from its intermediate position to eject the cartridge, said reel transport means is removed from engagement with operative elements in said cartridge.

23. A tape deck according to claim 15 including a motor carried by said movable frame and connected to said drive and transport means, and a switch for controlling the motor and actuatable in response to movement of said movable frame to its operative position to initiate the operation of said drive and transport means.

24. The tape deck according to claim 8 adapted to receive a tape cartridge having two reels with the tape being transportable from one reel to the other, and in which said drive and transport means includes a driven capstan adapted to penetrate said cartridge and engage the tape and a pair of hubs adapted to penetrate said cartridge and drivingly engage the tape reels, with the cartridge in its operative position in the tape deck.

25. The tape deck of claim 24 in which said movable frame is supported for translation following the movement of said cartridge upon its insertion and removal while simultaneously moving relatively normal to the plane of cartridge movement thereby to carry said driven capstan and hubs into and out of said cartridge in the course of its movement.

26. The tape deck of claim 15 in which said drive and transport means includes a driven capstan carried by said movable frame into the cartridge in the course of movement of said movable frame and cartridge to their operative positions, and said fixed frame carries a pinch roller, so that the tape is pinched between said roller and said capstan with said cartridge in its operative position.

27. The tape deck of claim 15 in which said translation means supports said movable frame for movement to an operative position on insertion of the cartridge and for reverse movement from said operative position, said means carried by said movable frame being operative as an incident to said reverse movement to carry the cartridge from its operative position and to position it for removal from the tape deck.

28. A tape deck according to claim 1 including latch means for holding said movable frame in its operative position with said projections in engagement with the operative elements within said cartridge, and resilient means carried by said movable frame and engageable with the cartridge to hold said cartridge in its operative position.

References Cited
UNITED STATES PATENTS 2,661,162 12/1953 Owens _____ 242—55.13
3,080,101 3/1963 Kreithen et al. _____ 226—174
3,146,316 8/1964 Knoth _____ 179—100.2

LEONARD D. CHRISTIAN, *Primary Examiner.*